United States Patent [19]

Kaku

[11] Patent Number: 5,162,492
[45] Date of Patent: Nov. 10, 1992

[54] HYDROLYTICALLY AND OXIDATIVELY STABLE POLYIMIDES

[75] Inventor: Mureo Kaku, Wilmington, Del.

[73] Assignee: E. I. Du Pont de Nemours and Company, Wilmington, Del.

[21] Appl. No.: 595,836

[22] Filed: Oct. 11, 1990

[51] Int. Cl.$^5$ .................. C08G 69/26; C08G 8/02; C08G 73/10
[52] U.S. Cl. .................. 528/353; 528/125; 528/172; 528/173; 528/176; 528/183; 528/220; 528/229; 528/350
[58] Field of Search .............. 528/353, 125, 172, 173, 528/176, 350, 183, 220, 229

[56] References Cited

U.S. PATENT DOCUMENTS

| | | | |
|---|---|---|---|
| 3,179,631 | 4/1965 | Endrey | 528/353 |
| 3,179,633 | 4/1965 | Endrey | 528/352 |
| 3,249,588 | 5/1966 | Gall | 528/126 |
| 4,238,538 | 12/1980 | Manwiller | 428/36 |
| 4,302,413 | 11/1981 | Howe et al. | 264/126 |
| 4,440,643 | 4/1984 | Makino et al. | 528/353 |
| 4,499,042 | 2/1985 | Ishizuka et al. | 528/353 |
| 4,755,555 | 7/1988 | Manwiller et al. | 524/607 |
| 4,778,872 | 10/1988 | Sasaki et al. | 528/176 |

*Primary Examiner*—John Kight, III
*Assistant Examiner*—P. Hampton-Hightower

[57] ABSTRACT

Polyimide prepared from 3,3'4,4'-biphenyltetracarboxylic dianhydride and an aromatic diamine which is at least about 60% meta-phenylene diamine exhibits excellent hydrolytic and oxidative stability.

6 Claims, No Drawings

HYDROLYTICALLY AND OXIDATIVELY STABLE POLYIMIDES

BACKGROUND OF THE INVENTION

Aromatic polyimides have long been known, such as those originally described in Endrey, U.S. Pat. No. 3,179,631 and Gall, U.S. Pat. No. 3,249,588. Further improved polyimides were recently discovered by Manwiller and Anton, and described in U.S. Pat. No. 4,755,555. Each of the above patents is hereby incorporated by reference.

Previous polyimides, with their resistance to high temperatures and overall mechanical properties, have found wide acceptance as coatings and fabricated parts used in technically demanding environments such as jet engines, business machines, automotive components and diverse industrial equipment. However, despite the excellent performance characteristics of previously available polyimide compositions, effort has been directed toward the further improvement of the resistance of polyimide articles to extended exposure to corrosive liquids and high temperature environments.

SUMMARY OF THE INVENTION

The present invention provides a polyimide resin which exhibits markedly improved hydrolytic and oxidative stability, compared to known polyimides, combined with the good mechanical properties characteristic of such polyimides.

Specifically, the present invention provides a substantially amorphous, solid particulate polyimide having the recurring unit

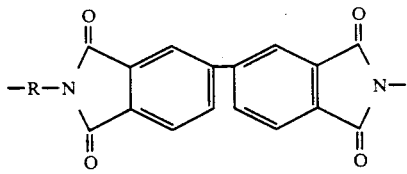

wherein R is at least about 60% meta-phenylene units and up to about 40% para-phenylene units, the particles of polyimide having a surface area of greater than about 15 square meters per gram.

Polyimides with higher concentrations of meta-phenylene units are preferred.

DETAILED DESCRIPTION OF THE INVENTION

The present invention is based on the discovery that, of the many reactants used to prepare polyimides, as described in the patents previously incorporated by reference, two particular compounds, reacted according to the general procedures of the Manwiller et al. patent, result in polyimides characterized by unexpectedly improved hydrolytic and oxidative stability.

The polyimides of the present invention are prepared from the reaction of 3,3'4,4'-biphenyltetracarboxylic dianhydride (BPDA) and an aromatic diamine which is at least about 60% meta-phenylene diamine (MPD).

The BPDA is characterized by the following structural formula:

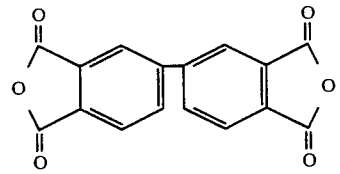

The aromatic diamine, in addition to the meta-phenylene diamine, can comprise up to about 40% of para-phenylene diamine. In general, increasing concentrations of the meta-phenylene diamine will result in improved mechanical properties. Accordingly, compositions having at least about 75% metaphenylene diamine units as the diamine moiety are preferred.

The BPDA and the aromatic diamine are reacted in substantially equimolar quantities. An excess of BPDA in the reaction mixture, for example, up to about 5%, has been found to give improved Tensile Strength in the final product.

The reactants are brought together in an organic solvent, the functional groups of which will not react with either of the reactants to any appreciable extent, and which exhibits a pH of about from 8 to 10. The pH of the solvent can be measured by immersing a piece of water-moistened pH paper in the pure solvent. Of those solvents disclosed in the Manwiller et al. patent, dimethyl acetamide and pyridine have been found to be particularly satisfactory in the preparation of the polyimides of the present invention, in attaining high surface area in the final particulate product.

The solvent used in the preparation of the present polyimides, in general, should be present in a quantity such that the concentration of the polymeric reaction product of the diamine and dianhydride is about from 1 to 50 % by weight of the solution, and preferably about from 1 to 20%.

The resulting polyamide acid is then simultaneously precipitated and at least partly converted to polyimide with nonsolvent for the polyamide acid. Of those described in the Manwiller et al. patent, acetone has been found to give high surface area and enhance the mechanical properties of the final products, and is accordingly preferred. The precipitating nonsolvent, such as acetone, should be used in such quantities as to provide at least about 40%, and preferably about from 60 to 80%, of the total of nonsolvent and reaction solvent.

The resulting polyimide powder, after forming into the desired final configuration, is then generally further heat cured, for example, at temperatures of about from 130° to 250.C., to substantially complete the conversion of the polymer to polyimide.

The polyimide often comprises fillers, and particularly carbonaceous fillers such as graphite, to improve wear and frictional characteristics, while retaining, to a large extent, the excellent tensile properties of the polyimides. Other fillers which can be used with the present polyimides include molybdenum disulfide and tetrafluoroethylene polymers and copolymers. The particular filler or fillers selected will, of course, depend on the effect desired in the final composition, as will be evident to those skilled in the art. These fillers are typically incorporated into the reaction mixture prior to precipitation. The form of the fillers will depend on the function of the filler in the final products. For example, the fillers can be in particulate or fibrous form.

The particulate polyimide can be molded at pressures of about from 50,000 to 150,000 psi. The physical properties of the molded articles can be further improved, as with previously known polyimides, by sintering. The sintering is generally carried out at elevated temperatures of about from 300° to 450° C.

The polyimides of the present invention are characterized not only by the excellent high temperature resistance typical of many polyimides, but improved resistance to water, caustic such as sodium hydroxide and acids such as hydrochloric, sulfuric, nitric and acetic acids. These properties permit the use of the present compositions in a broader range of applications than was previously thought possible for polyimides.

The present invention is further illustrated by the following specific Examples and Comparative Examples, in which parts and percentages are by weight unless otherwise indicated. In these Examples, the following test procedures were used to evaluate the polyimides produced.

Hydrolytic Stability

The hydrolytic stability of polyimides was tested by exposing a tensile bar of the polyimide to an aqueous 1% sodium hydroxide (NaOH aq) solution at 50° C. The mechanical properties, tensile strength and elongation of tensile bars were tested during the course of exposure. The weight change of tensile bars was also monitored.

Oxidative Stability

The oxidative stability of polyimides was tested by exposing tensile bars to a temperature of 360° C. in air. The mechanical properties, tensile strength and elongation, were tested over time. The weight loss of tensile bars was also monitored for comparison.

In all Examples of the present invention, the resulting polyimide was substantially amorphous, and in particulate form having a surface area greater than 15 square meters per gram.

EXAMPLE 1

96.74 g of meta-phenylene diamine (MPD) was dissolved in 3296 ml of pyridine at 54° C. Biphenyl tetracarboxylic anhydride (BPDA), 263.24 g, was added together with 100 ml of pyridine to give a 10% polymer solution. The reaction solution was then heated to 70° C. and maintained at that temperature for 2 hours. A solution of inherent viscosity of 0.58 dl/g (in pyridine) was formed. Then 333 g of pyridine was added to each 1000 g of reaction solution to form 7.5% polymer solution The polymer solution was pumped together with acetone at 231 g/min into a continuous precipitator at 150 g/min with continuous stirring. The ratio of acetone to pyridine used for precipitation was 62.5 to 37.5. The resulting powder was washed with three volumes of acetone. The resulting powder was filtered, and the filter cake was dried for 16 hours at 180° C. and 25' of mercury vacuum under a nitrogen purge. The dried resin was ground through a 30-mesh screen in a laboratory scale Wiley mill. The dried resin was fabricated into tensile bars according to ASTM test E8 at room temperature and 100,000 psi forming pressure. The tensile bars were sintered at 405° C. for 3 hours with nitrogen purge and tested. The tensile bars were found to have a density of 1.35 g/cm$^3$, and a tensile strength and elongation of 22.0 Kpsi and 11.3%, respectively.

EXAMPLE 2

The procedure of Example 1 was repeated, except the ratio of pyridine and acetone for precipitation was 30 to 70. The resulting polymer was tested as before, and the tensile strength and elongation were found to be 22.0 Kpsi and 10.0%.

EXAMPLE 3

The procedure of Example 2 was repeated, except the polymer solution concentration was 10%. The resulting polymer was tested as before, and the tensile strength and elongation were found to be 20.8 Kpsi and 8.9%.

EXAMPLE 4

96.0 g of meta-phenylene diamine (MPD) was dissolved in 3087 ml of pyridine at 54° C. Biphenyl tetracarboxylic dianhydride (BPDA), 261.19 g was added, together with 100 ml of pyridine, to give a 10% polymer solution. The reaction solution was then heated to 70° C. The inherent viscosity of the polymer solution after one hour was 0.70 dl/g (in pyridine). After aging for 1.5 hours, 36.15 g of graphite was added, together with 100 ml of pyridine. After 2 hours of aging at 78° C., 453.3 g of pyridine was added to each 1000 g of reaction solution to form a 7.5% polymer solution. The reaction solution was then cooled to 40° C.

The polymer solution so formed was pumped, together with acetone at 231 g/min into a continuous precipitator at 150 g/minute with continuous stirring. The ratio of acetone and pyridine used for precipitation was 62.5 to 37.5. The resulting powder was washed with acetone. The resulting filter cake was dried for 16 hours at 180° C. and 25" of mercury vacuum under a nitrogen purge. The dried resin was ground through a 30-mesh screen in a laboratory scale mill. The dried resin was fabricated into tensile bars as in Example 1 and tested. The tensile bars were sintered at 405° C. for 3 hours with nitrogen purge. The resulting tensile bars exhibited a density of 1.40 g/cm$^3$, with tensile strength and elongation of 20.8 Kpsi and 10.6%, respectively.

COMPARATIVE EXAMPLES A-C

In Comparative Examples A and B, resins were prepared according to the procedures of U.S. Pat. No. 4,755,555. The resin of Comparative Example A was prepared from 4,4'-diaminodiphenyl ether and pyromellitic dianhydride, according to the general procedure of Example 1 of that patent. The resin of Comparative Example B was prepared from meta-phenylene diamine and pyromellitic dianhydride, according to the general procedure of Example 28 of that patent.

In Comparative Example C, the resin was prepared from pyromellitic dianhydride and 4,4'-diaminodiphenyl ether according to the general procedures of U.S. Pat. No. 3,249,588, Example III.

The polyimide resins of Example 1 and Comparative Examples A-C were tested in NaOH aq solution.

In Tables 1 and 2, the results of tensile strength and elongation after exposure to 1% NaOH aq solution are summarized, respectively. The weight change of polyimides is summarized in Table 3.

TABLE 1

Tensile Strength (Kpsi) of Polyimides in 1% NaOH aq Solution at 50° C.

| days | EXAMPLE 1 | A | B | C |
|---|---|---|---|---|
| 0 | 20.5 | 15.4 | 18.5 | 11.4 |
| 1 | 19.8 | 15.0 | 15.0 | 8.1 |
| 2 | 19.6 | 14.7 | 13.1 | 6.1 |
| 3 | 18.9 | 14.7 | 5.7 | 5.4 |
| 5 | 18.2 | 14.2 | | |
| 7 | 18.4 | 13.8 | | |
| 14 | 18.4 | | | |

TABLE 2

Elongation (%) of Polyimides in 1% NaOH aq Solution at 50° C.

| days | EXAMPLE 1 | A | B | C |
|---|---|---|---|---|
| 0 | 9.0 | 24.2 | 11.8 | 9.0 |
| 1 | 11.5 | 12.9 | 18.1 | 10.0 |
| 2 | 9.7 | 23.2 | 9.6 | 8.8 |
| 3 | 10.1 | 23.6 | 2.4 | 7.8 |
| 5 | 11.7 | 21.4 | | |
| 7 | 12.0 | 17.7 | | |
| 14 | 13.1 | | | |

TABLE 3

Weight Change (%) of Polyimides in 1% NaOH aq Solution at 50° C.

| days | EXAMPLE 1 | A | B | C |
|---|---|---|---|---|
| 0 | 0 | 0 | 0 | 0 |
| 1 | 1.1 | 1.2 | 2.1 | 20.3 |
| 2 | 1.6 | 1.8 | 10.0 | 40.4 |
| 3 | 1.8 | 3.0 | 19.9 | 36.9 |
| 5 | 2.9 | 4.8 | | |
| 7 | 3.5 | 5.5 | | |
| 14 | 3.9 | | | |

The samples were exposed to the NaOH solution and tested. Accordingly, the hydrolytic stability of the polyimide of Comparative Example A was relatively good, lasting for 7 days of exposure in this condition. The polyimide of Comparative Example B fractured within 3 days and that of Comparative Example C was swollen and very weak at same time period. The resin of the present invention, in Example 1, exhibited considerably higher hydrolytic stability than any of the Comparative Examples A-C.

The oxidative stability of the polyimides of Example 1 and Comparative Examples A-C were compared, and the results are reported in Tables 4-6.

TABLE 4

Tensile Strength Change (Kpsi) of Polyimides at 360° C. in Air

| days | EXAMPLE 1 | A | B | C |
|---|---|---|---|---|
| 0 | 21.5 | 12.4 | 18.7 | 11.4 |
| 1.3 | 20.2 | — | — | — |
| 2 | — | 8.6 | 16.4 | 7.0 |
| 4 | — | 6.1 | 13.9 | 7.3 |
| 4.5 | 19.0 | — | — | — |
| 8 | — | 4.0 | 12.4 | 5.9 |
| 8.5 | 15.8 | — | — | — |
| 16 | — | 2.7 | 8.7 | 1.7 |
| 16.5 | 13.3 | — | — | — |
| 32 | — | — | 6.3 | — |
| 32.5 | 11.5 | — | — | — |

TABLE 5

Elongation Change (%) of Polyimides at 360° C. in Air

| days | EXAMPLE 1 | A | B | C |
|---|---|---|---|---|
| 0 | 11.1 | 15.0 | 11.3 | 9.0 |
| 1.3 | 7.2 | — | — | — |
| 2 | — | 4.0 | 6.1 | 2.8 |
| 4 | — | 2.1 | 4.4 | 2.8 |
| 4.5 | 5.8 | — | — | — |
| 8 | — | 1.1 | 3.5 | 1.9 |
| 8.5 | 3.9 | — | — | — |
| 16 | — | 1.2 | 2.2 | 0.7 |
| 16.5 | 1.5 | — | — | — |
| 32 | — | — | 1.5 | — |
| 32.5 | 2.4 | — | — | — |

TABLE 6

Weight Loss (%) of Polyimides at 360° C. in Air

| days | EXAMPLE 1 | A | B | C |
|---|---|---|---|---|
| 0 | — | — | — | — |
| 1.3 | 0.3 | — | — | — |
| 2 | — | 0.8 | 0.3 | 0.6 |
| 4 | — | 1.6 | 0.5 | 1.2 |
| 4.5 | 0.8 | — | — | — |
| 8 | — | 4.3 | 1.0 | 3.3 |
| 8.5 | 1.3 | — | — | — |
| 16 | — | 13.7 | 1.9 | 10.0 |
| 16.5 | 1.8 | — | — | — |
| 32 | — | — | 3.9 | — |
| 32.5 | 1.6 | — | — | — |

Comparative Examples D and E

In Comparative Example D, resin was prepared according to U.S. Pat. No. 4,755,555. The resin was prepared from 4,4'-diaminodiphenyl ether and pyromellitic dianhydride, according to the general procedure of Example 1 of that patent, and further including 10% synthetic graphite, incorporated into the reaction mixture prior to precipitation.

The resin of Comparative Example E was prepared from the same reactants as Comparative Example D, but contained 15% natural graphite instead of the 10% synthetic graphite of Comparative Example D, and was prepared according to the general procedure of Example III of Gall, U.S. Pat. No. 3,249,588.

The polyimide resins of Example 4 and Comparative Examples D and E were tested for resistance to 1% and 5% NaOH aq solutions. The results are summarized in Tables 7-10.

TABLE 7

Tensile Strength (Kpsi) of Graphite Containing Polyimides in 1% NaOH aq Solution at 50° C.

| days | EXAMPLE 4 | D | E |
|---|---|---|---|
| 0 | 20.1 | 10.3 | 9.3 |
| 1 | 18.9 | 8.8 | 7.6 |
| 3 | 18.7 | 7.3 | 4.9 |
| 7 | 17.5 | 6.1 | 0 |

TABLE 8

Elongation (%) of Graphite Containing
Polyimides in 1% NaOH aq Solution at 50° C.

| days | EXAMPLE | | |
|---|---|---|---|
| | 4 | D | E |
| 0 | 8.9 | 12.1 | 5.3 |
| 1 | 11.6 | 10.5 | 5.0 |
| 3 | 12.2 | 5.9 | 2.9 |
| 7 | 12.3 | 4.4 | 0 |

TABLE 9

Tensile Strength (Kpsi) of Graphite Containing
Polyimides in 5% NaOH aq Solution at 50° C.

| days | EXAMPLE | | |
|---|---|---|---|
| | 4 | D | E |
| 0 | 20.1 | 10.3 | 9.3 |
| 1 | 18.7 | 6.1 | 0 |
| 3 | 17.6 | 2.4 | 0 |
| 7 | 15.4 | 0 | 0 |

TABLE 10

Elongation (%) of Graphite Containing
Polyimides in 5% NaOH aq Solution at 50° C.

| days | EXAMPLE | | |
|---|---|---|---|
| | 4 | D | E |
| 0 | 8.9 | 12.2 | 5.3 |
| 1 | 11.0 | 5.3 | 0 |
| 3 | 8.7 | 2.4 | 0 |
| 7 | 10.5 | 0 | 0 |

The polyimide of Example 4 exhibits markedly greater hydrolytic stability than those of the Comparative Examples.

The oxidative stability of graphite containing polyimides of Example 4 and Comparative Examples D-E were tested at 360° C. in air. The mechanical properties change are described in Table 11 and 12.

TABLE 11

Tensile Strength (Kpsi) of Polyimides
at 360° C. in Air

| days | EXAMPLE | | |
|---|---|---|---|
| | 4 | D | E |
| 0 | 19.3 | 10.8 | 9.2 |
| 2 | 19.7 | 9.1 | 7.4 |
| 4 | 18.9 | 8.2 | 6.8 |
| 8 | 19.4 | 4.9 | 4.7 |
| 16 | 18.9 | 2.3 | 2.9 |
| 32 | 17.9 | | |

TABLE 12

Elongation (%) of Polyimides
at 360° C. in Air

| days | EXAMPLE | | |
|---|---|---|---|
| | 4 | D | E |
| 0 | 7.2 | 10.5 | 4.8 |
| 2 | 8.3 | 4.7 | 2.5 |
| 4 | 6.3 | 3.7 | 2.2 |
| 8 | 7.0 | 1.4 | 1.1 |
| 16 | 6.2 | 0.5 | 0.6 |
| 32 | 5.3 | | |

Weight loss of samples are summarized in Table 13.

TABLE 13

Weight loss (%) of Polyimides
at 360° C. in Air

| days | EXAMPLE | | |
|---|---|---|---|
| | 4 | D | E |
| 0 | 0 | 0 | 0 |
| 2 | 0.2 | 0.5 | 0.5 |
| 4 | 0.2 | 1.1 | 1.2 |
| 8 | 0.5 | 2.6 | 2.9 |
| 16 | 0.9 | 11.0 | 9.2 |
| 32 | 1.6 | | |

These results indicate the oxidative stability of BPDA-MPD polyimides to be far superior than that of PMDA-ODA polyimides.

EXAMPLES 5-6 AND COMPARATIVE EXAMPLES F-H

In these Examples and Comparative Examples, the ratio of m-phenylenediamine (MPD) and p-phenylenediamine (PPD) incorporated into the polyimide was varied. The general reaction procedure of Example 1 was used. The amounts, in parts by weight, of the components is summarized in Table 14. The polyimides were evaluated for mechanical properties, and the results summarized in Table 15.

TABLE 14

| EXAMPLE | Composition of Examples | | | Inherent Viscosity |
|---|---|---|---|---|
| | BPDA (parts) | MPD (parts) | PPD (parts) | |
| 1 | 100 | 100 | — | 0.55 |
| 5 | 100 | 90 | 10 | 0.64 |
| 6 | 100 | 75 | 25 | 0.65 |
| F | 100 | 50 | 50 | 0.64 |
| G | 100 | 25 | 75 | 0.68 |
| H | 100 | — | 100 | * |

*)insoluble in pyridine.

TABLE 15

| EXAMPLE | Mechanical Properties | | Specific Gravity |
|---|---|---|---|
| | Tensile Strength (Kpsi) | Elongation (%) | |
| 1 | 21.1 | 10.9 | 1.318 |
| 5 | 21.5 | 10.8 | 1.339 |
| 6 | 21.4 | 10.0 | 1.334 |
| F | 11.1 | 2.1 | 1.246 |
| G | 15.2 | 2.3 | 1.396 |
| H | 13.4 | 2.0 | 1.405 |

I claim:

1. A substantially amorphous, solid particulate polyimide having the recurring unit $$-R-N\underset{O}{\overset{O}{\underset{\|}{\overset{\|}{\diagdown}}}}\underset{}{\underset{}{\bigcirc}}-\underset{}{\underset{}{\bigcirc}}\underset{O}{\overset{O}{\underset{\|}{\overset{\|}{\diagup}}}}N-$$

wherein R is at least about 60% meta-phenylene units and up to about 40% para-phenylene units, the particles of polyimide having a surface area of greater than about 15 square meters per gram.

2. A polyimide of claim 1 wherein R is at least about 75% metaphenylene units.

3. A polyimide of claim 2 wherein R consists essentially of meta-phenylene units.

4. A polyimide of claim 1 further comprising at least about 1% filler.

5. A polyimide of claim 4 wherein the filler is in particulate form.

6. A polyimide of claim 4 wherein the filler consists essentially of graphite.

* * * * *